(12) United States Patent
Jain

(10) Patent No.: US 6,357,000 B1
(45) Date of Patent: Mar. 12, 2002

(54) METHOD AND SYSTEM FOR SPECIFIED LOADING OF AN OPERATING SYSTEM

(75) Inventor: Naveen K. Jain, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/558,045

(22) Filed: Nov. 13, 1995

Related U.S. Application Data

(63) Continuation of application No. 08/011,318, filed on Jan. 29, 1993, now abandoned.

(51) Int. Cl.⁷ .............................................. G06F 9/00
(52) U.S. Cl. ........................................................ 713/1
(58) Field of Search ................................ 713/1, 2, 100; 709/332

(56) References Cited

U.S. PATENT DOCUMENTS

| | | | | |
|---|---|---|---|---|
| 4,179,735 A | * | 12/1979 | Lodi | 395/700 |
| 4,654,783 A | * | 3/1987 | Vereo et al. | 364/DIG. 1 |
| 4,675,814 A | * | 6/1987 | Murai et al. | 395/425 |
| 4,979,106 A | * | 12/1990 | Schneider | 395/700 |
| 5,022,077 A | | 6/1991 | Bealkowski et al. | |
| 5,093,915 A | * | 3/1992 | Platteter et al. | 395/700 |
| 5,134,580 A | * | 7/1992 | Bertram et al. | 395/650 |
| 5,136,713 A | | 8/1992 | Bealkowski et al. | |
| 5,142,680 A | * | 8/1992 | Ottman et al. | 395/700 |
| 5,210,875 A | | 5/1993 | Bealkowski et al. | |
| 5,214,695 A | * | 5/1993 | Arnold et al. | 380/4 |
| 5,325,532 A | * | 6/1994 | Crosswy et al. | 395/700 |
| 5,355,498 A | * | 10/1994 | Provino et al. | 395/700 |
| 5,367,686 A | * | 11/1994 | Fisher et al. | 395/700 |
| 5,410,699 A | | 4/1995 | Bealkowski et al. | |
| 5,459,867 A | * | 10/1995 | Adams et al. | 395/700 |
| 5,497,492 A | * | 3/1996 | Zbikowski et al. | 395/700 |
| 5,555,416 A | * | 9/1996 | Owens et al. | 395/700 |
| 5,600,823 A | * | 2/1997 | Sherer et al. | 395/500 |
| 5,634,058 A | * | 5/1997 | Allen et al. | 707/712 |
| 5,675,795 A | * | 10/1997 | Rawson, III et al. | 395/652 |
| 5,781,797 A | * | 7/1998 | Crick et al. | 395/830 |

* cited by examiner

Primary Examiner—Majid A. Banankhah
Assistant Examiner—Sne Lao
(74) Attorney, Agent, or Firm—Christensen O'Connor Johnson Kindness PLLC

(57) ABSTRACT

A computer method and system for user-specified loading of an operating system. Operating system load modules, composed of permanent load modules and variable load modules, are stored on a storage device. The permanent load modules and variable load modules each comprise operating system instructions. Although all of the permanent load modules are included in the operating system, only variable load modules that are specified by the user are included in the operating system. A user identification is initially obtained of variable load modules to be included as user-specified load modules in the operating system. Upon computer startup, the user-specified load modules and the permanent load modules are loaded into memory. The operating system instructions comprised by the user-specified load modules and permanent load modules thus comprise the loaded operating system.

27 Claims, 12 Drawing Sheets

METHOD AND SYSTEM FOR SPECIFIED LOADING OF AN OPERATING SYSTEM

CROSS-REFERENCE TO RELATED APPLICATION

This application is a continuation of U.S. patent application Ser. No. 08/011,318, filed Jan. 29, 1993, now abandoned.

TECHNICAL FIELD

The present invention relates generally to the field of operating systems and, more particularly, to a method and system for user-specified loading of an operating system.

BACKGROUND OF THE INVENTION

A conventional computer system provides a user with the ability to run a variety of applications programs. In order to provide this feature effectively, however, such a computer system must be equipped with an operating system. As is well known in the art, an operating system provides central functions which are essential to operation of the computer system. The operating system controls the use of hardware resources necessary to run the application programs. For example, the operating system controls allocation of memory and processing time to the application programs. The fundamental portion of the operating system is a hardware-independent program, such as Microsoft's MS-DOS, OS/2, etc. When this program is implemented into a computer system, it incorporates hardware-specific code that allows it to load into that computer system and correctly control the specific hardware that is a part of that computer system. The incorporation of this hardware-specific code into the hardware-independent program provides the complete, working operating system.

An example of the conventional computer system is the personal computer system illustrated in FIG. 1. The computer system shown in FIG. 1 includes a microcomputer 100, a peripheral storage device such as a disk 110, peripheral input devices such as a keyboard 120, a mouse 130, etc., and peripheral output devices such as a display monitor 140, a printer 150, etc. The microcomputer 100 contains a central processing unit (CPU) 102, a memory 104 and an input/output unit (I/O) 106. An operating system, including a hardware-independent portion such as MS-DOS, OS/2, etc., as well as a hardware-specific portion, is stored in the memory 104. The operating system contains operating system instructions which are executed by the CPU 102. Upon execution of the operating system instructions, the operating system controls, for example, allocation of the memory 104, allocation of processing time of the CPU 102, and use of the peripheral devices 110, 120, 130 and 140.

Typically, the operating system instructions which compose the operating system are initially stored on the disk 110. As such, the operating system instructions must be loaded into the memory 104 before becoming operational. When a user turns on the power of the computer system or reboots the computer system (hereinafter referred to as startup), the CPU 102 first performs an initialization process which provides this function. The initialization process, in addition to performing functions such as testing and initializing the computer system hardware, loads the operating system stored on the disk 110 into the memory 104. The operating system thereafter controls operation of the computer system to run a variety of application programs for the user.

An example of such an initialization process is the system initialization program performed by the IBM PC or by an IBM PC compatible computer system. The IBM PC is a well known computer system designed by IBM Corporation. Upon computer startup, the CPU 102 initially performs a system initialization program composed of machine-readable instructions stored in a ROM (Read Only Memory) portion of the memory 104. The system initialization program performs, in addition to various initialization and testing functions, a conventional operating system load routine which loads operating system instructions that compose an operating system from the disk 110 into the memory 104. Thereafter, the operating system instructions are executable by the CPU 102 to control allocation and use of the hardware.

A general flow diagram of the conventional operating system load routine is shown in FIG. 2. In step 202, the conventional operating system load routine (Conventional OS Load) reads a load data structure from the disk 110 into the memory 104. The load data structure contains a partition identifier which identifies an operating system partition stored on the disk 110. This operating system partition contains the operating system instructions which compose the operating system, as well as a set of machine readable instructions for loading those operating system instructions into the memory 104. In step 204, the conventional load routine reads a load record from the indicated operating system partition. The load record indicates operating system load modules stored on the operating system partition, each of which contain operating system instructions. The load record also contains load instructions for loading these operating system load modules. In step 206, the conventional load routine loads the operating system load modules indicated by the load record by executing the load instructions in the load record, upon which the operating system load routine portion of the system initialization routine is complete.

In the conventional operating system load routine explained above, a user of the computer system has no control over the process by which the operating system load modules are loaded from the disk 110 into the memory 104. That is, whichever operating system load modules are stored in the operating system partition and indicated by the load record stored therein are loaded into the memory 104. As a result of this limitation, the user has no way to specify the operating system instructions which become a part of the operating system. Thus, it is impossible for the user to enhance the operating system or correct malfunctions in the operating system prior to the time the operating system is loaded by varying the operating system instructions which are loaded into memory. For example, when the hardware-specific code does not function properly or as desired, the only option conventionally has been to replace the microchip on which the system initialization program is provided with a microchip containing an updated system initialization program.

Further, it is not possible to provide such enhancements or corrections in an optional fashion. Replacement of a microchip every time a user of the computer system wishes to change a feature of the operating system is not feasible. This problem might be solved in part by providing alternate sets of operating system load modules on different partitions on the disk 110, each set representing an alternate version of the operating system. However, such a solution has significant limitations. One limitation is that disk space is often limited on the disk on which the operating system is provided. To provide alternate versions of the operating system on different partitions would require that a large number of operating system load modules common to all versions would be redundantly stored on each version. Thus, a great deal of disk space would be wasted. Further, the conventional load record is not equipped to load an operating system from more than a limited number of partitions, or from a partition located beyond a certain location on the disk. For example, the Master Boot Record provided as the load record on conventional MS-DOS disks contains only four partition descriptors, each of which contains a single partition identifier. Thus, the Master Boot Record can reference only a limited number (4) of the partitions.

An additional problem with this approach is that the Master Boot Record contains partition identifiers of limited size, and thus cannot reference a partition with a disk address starting beyond a finite boundary (the 1024 cylinder boundary). If one or more versions of an operating system require disk space which exceeds this boundary, then no additional partitions can be referenced. As noted above, to provide alternate versions of the operating system on different partitions would require a great deal of disk space. As a result, alternate versions of the operating system are likely to be unidentifiable by the Master Boot Record. Thus, conventionally, only the single operating system partition has been implemented to store the operating system instructions that compose an operating system.

SUMMARY OF THE INVENTION

An object of the invention is to provide a user with control over the operating system instructions which compose an operating system.

Another object of the invention is to provide a user with the ability to specify which operating system load modules are loaded into memory.

Yet another object of the invention is to provide a user with the capability of enhancing or correcting an operating system prior to loading of the operating system.

Still another object of the invention is to provide a user with the capability of authorizing or denying authorization of various operating system load modules to be included in an operating system.

These and other objects are obtained by a method and system for user-specified loading of an operating system, described as follows. Operating system load modules, composed of permanent load modules and variable load modules, are stored on a disk. The permanent load modules are stored on an operating system partition on the disk, and the variable load modules are stored on one or more variable partitions on the disk. The permanent load modules and variable load modules each comprise operating system instructions. The variable load modules may implement any of a variety of optional routines which the user might wish to load, such as a device driver. Although all of the permanent load modules are included in the operating system, only variable load modules specified by the user are included in the operating system. Initially, a first variable partition is accessed and a user identifies which of the variable load modules are to be included as user-specified load modules in the operating system. Then, upon computer startup, the user-specified load modules and the permanent load modules are loaded into memory. The operating system instructions comprised by the loaded permanent load modules and user-specified load modules thus comprise the loaded operating system.

DETAILED DESCRIPTION OF THE INVENTION

Figure 1:
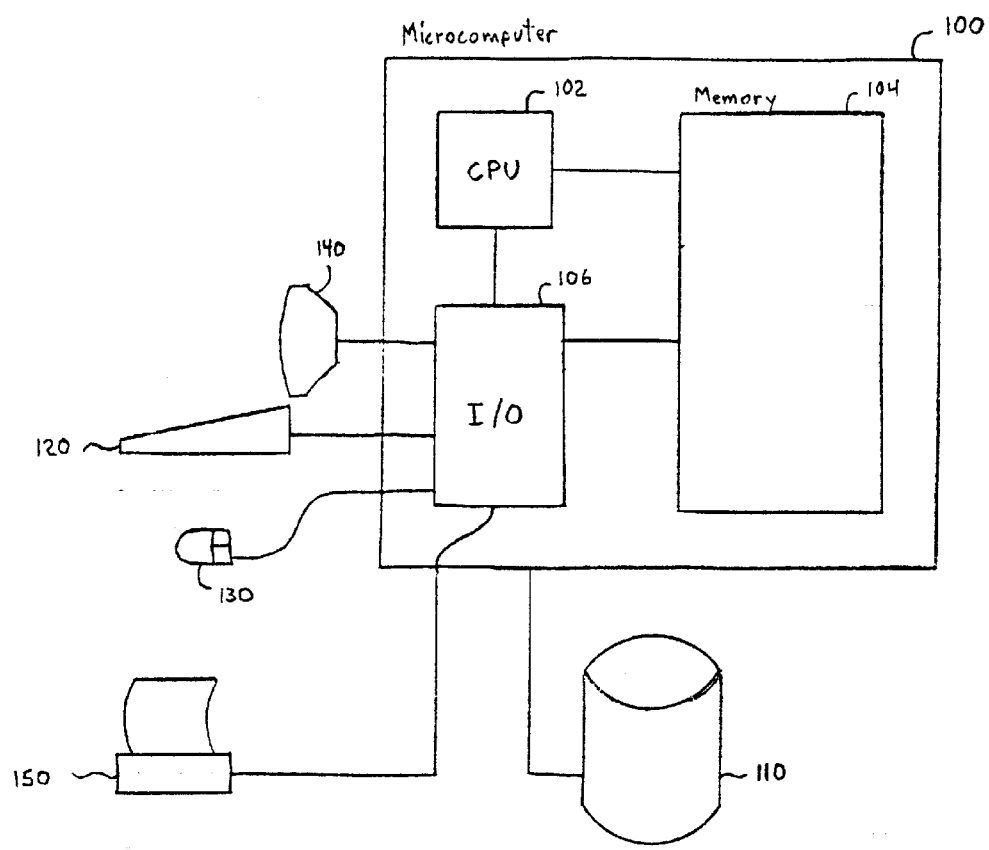
FIG. 1 is an illustration of a conventional computer system.
Figure 2:
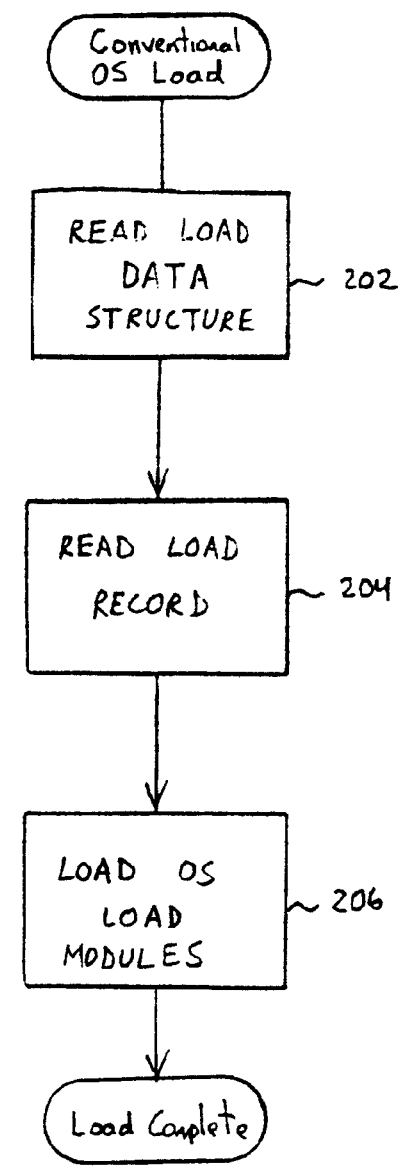
FIG. 2 is a general flow diagram of a conventional operating system load routine.

The present invention provides a method and system for user-specified loading of an operating system. Operating system load modules which contain operating system instructions are stored on storage devices, such as a disk. These operating system load modules include not only permanent load modules which are always loaded, but also variable load modules which are loaded only as specified by the user. A user initially specifies the variable load modules which are to be included in the operating system. These user-specified load modules are then loaded into memory along with the permanent load modules. The operating system instructions in the loaded permanent load modules and user-specified load modules thus compose the loaded operating system.

In a preferred embodiment of the invention, a computer, such as the microcomputer 100, is provided with a load program in the memory 104. This load program contains a user load control routine which allows a user to designate the user-specified load modules. The load program also contains an operating system load routine which loads the user-specified load modules from a disk (such as the disk 110) into memory (such as the memory 104) along with the permanent load modules. Specifically, an operating system partition is provided on the disk which corresponds to a particular operating system and which stores the permanent load modules which are always included in that operating system. Also, one or more variable partitions are separately provided on disk, each of which proximately stores variable load modules. The variable load modules are loaded only as specified by the user and may therefore implement optionally specified enhancements or corrections to the operating system.

In a particularly preferred embodiment, the variable load modules stored in the variable partition are operating system independent. That is, these operating system independent variable load modules have operating system instructions that are compatible with, and thus may be included in, any underlying operating system. This underlying operating system could be, for example, that composed by the permanent load modules in the operating system partition, explained above. The variable load modules are thus available to be included in either underlying operating system. In this particularly preferred embodiment, the operating system partition also stores variable load modules of its own. These variable load modules, called operating system specific variable load modules, contain operating system instructions which are compatible only with those operating system instructions in the operating system partition. Although the operating system independent variable load modules potentially may be included in other operating systems, the operating system specific variable load modules may be included only in the operating system corresponding to a specific operating system partition.

In the preferred embodiment, a load data structure is stored on the disk which indicates a first partition to be referenced by the load program, and each variable partition contains a read table which indicates a next partition to be referenced by the load program. Where operating system independent variable load modules are to be optionally loaded, the first partition to be referenced is a variable partition. Otherwise, the operating system partition is the first and only partition referenced. The load data structure contains read indications (e.g. read flags), each corresponding to a partition on the disk indicated by a partition identifier. One such read indication indicates that the corresponding partition is to be read from initially by the load program to load the permanent or variable load modules from the disk into memory. Similarly, each variable partition stores a variable partition read table. The variable partition read table also contains read indications (e.g. read flags) that each correspond to a partition on disk. One such read indication indicates whether the corresponding partition is to be read from next by the load program to load the permanent or variable load modules from the disk into the memory.

Each variable load module contains operating system instructions for performing a routine which provides the operating system with an optional feature. Each variable load module also contains a load indication (e.g. a load flag) which indicates whether the variable load module is to be loaded when the partition on which it is stored is read by the load program. In the particularly preferred embodiment discussed above, each operating system specific variable load module contains a load indication designating whether or not it is to be loaded when the operating system partition is read. Each operating system independent variable load module contains a load indication indicating whether it is to be loaded when the variable partition is read. By specifying the contents of the read indications and/or the load indications, the user controls which of the variable load modules are to be included in the operating system as user-specified load modules.

One of ordinary skill in the art will recognize a variety of routines which can be implemented by the operating system instructions within the variable load modules. Typically provided operating system features can be optionally included or chosen from among a variety of alternative routines. Further, supplemental routines can be added to current operating system versions to enhance the operating system or correct inaccuracies or deficiencies therein. Also, security can be provided with respect to the features implemented within specified variable load modules by providing the user with the ability to authorize or deny authorization of the specified variable load modules. It should be understood that such features are not limited to those typically thought of as part of an operating system. Rather, one of ordinary skill in the art will recognize an unlimited variety of features that can be implemented with the variable load modules and selectably loaded modules based on input from the user. An example of such a feature would be a device driver which a user might load to control use of a particular device.

Additionally, by providing variable partitions which each have the ability to designate a next partition to reference, the invention can reference partitions stored anywhere on the disk. For example, although Master Boot Record cannot reference a partition beyond a finite boundary, such a partition can be referenced by a variable partition that has been loaded as designated by the Master Boot Record or another variable partition. Further, since the variable partitions can be optionally referenced so as to load the variable load modules therein, these variable load modules are available to be loaded into different operating systems or different operating system versions. Since each variable partition contains operating system independent variable load modules and can reference any operating system partition, the same variable load modules can potentially be loaded into different operating systems.

Figure 3:
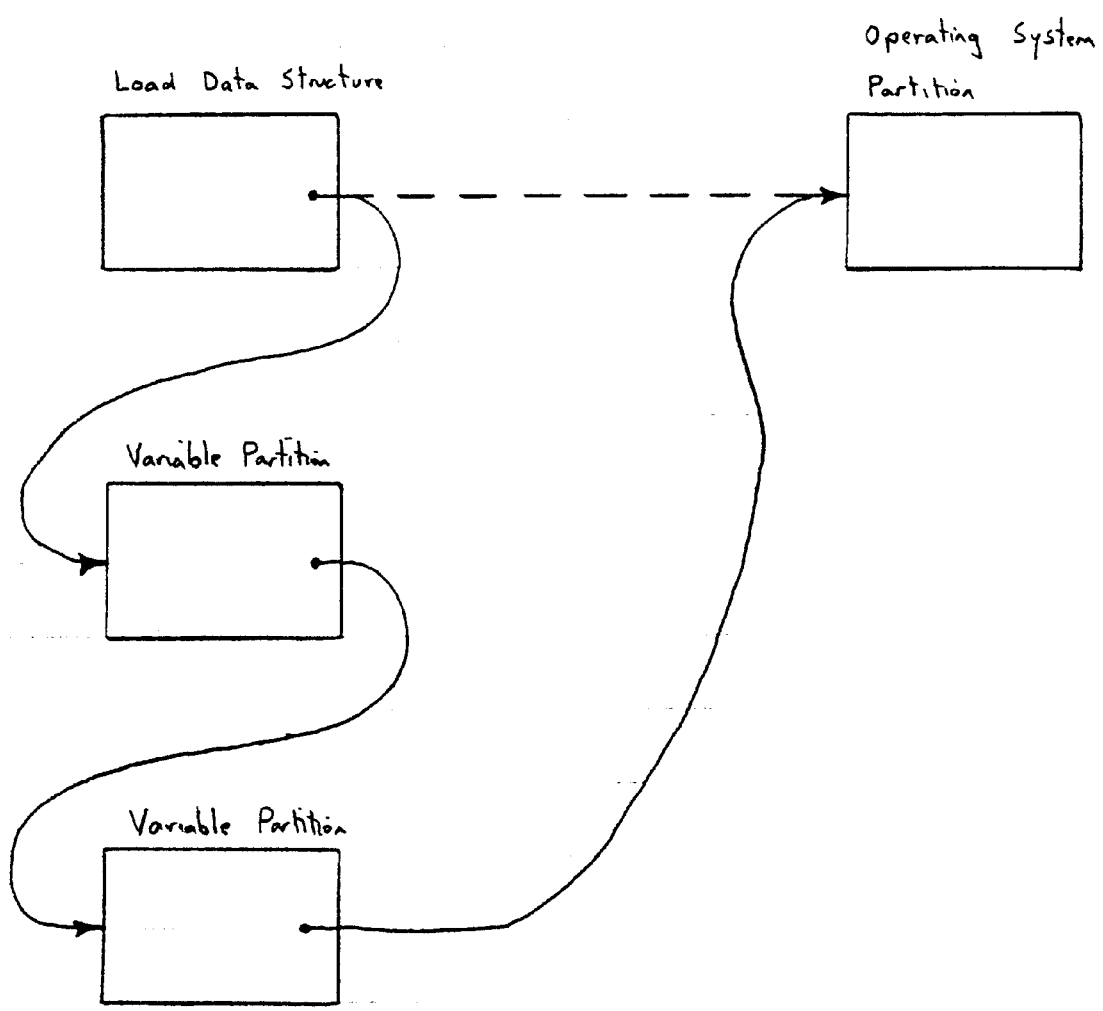
FIG. 3 is a diagram showing the relationship between the Load Data Structure, the Variable Partitions and the Operating System Partition in the present invention.

FIG. 3 is a conceptual diagram showing an example of the relationship between the load data structure, the variable partitions and the operating system partition when an operating system is loaded. The load data structure is initially referenced by the load program. The load data structure 300 has a read indication (as will be explained in more detail) which indicates that an identified first partition 310 is to be referenced. Conventionally, this partition has been the operating system partition 320 (shown by the dotted line), which was the only partition from which modules were loaded. In accordance with the present invention, however, the first partition can be either the operating system partition 320 or a variable partition 310 (as shown). If the first partition 310 is a variable partition, operating system modules are loaded from that variable partition and then the variable partition indicates with a read indication an identified next partition to be referenced, which can also be either the operating system partition 320 or another variable partition 312 (as shown). The next variable partition 312 likewise has a read indication which can indicate an identified next partition that is either the operating system partition 320 (as shown) or another variable partition (not shown).

When the operating system partition is finally referenced and the operating system load modules contained therein are loaded, loading of the operating system is completed. Preferably, the operating system partition is implemented essentially as a conventional operating system partition, and is processed essentially as with the conventional operating system load routine (except that operating system-specific variable load modules may be loaded). As the conventional operating system partition has previously been the only operating system partition from which operating system load modules are loaded, it does not contain read indications, and thus is loaded last (as shown). Although a single operating system is shown and discussed for the sake of simplicity of description, it is noted that the present invention references a different operating system partition containing different operating system load modules to be finally loaded. Thus, the variable load modules in the variable partition are available to be loaded into any underlying operating system.

Figure 4:
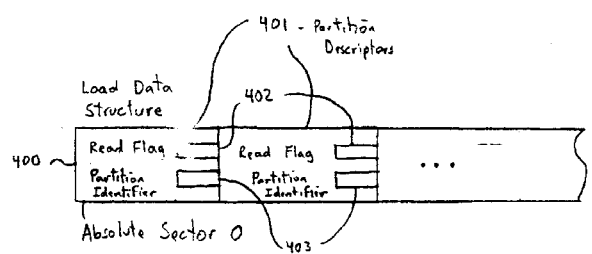
FIG. 4 is an illustration of the load data structure provided in the preferred embodiment of the invention.

FIG. 4 is an illustration of the load data structure provided in the preferred embodiment of the invention. In FIG. 4, the load data structure 400 is shown stored at absolute sector zero (cylinder 0, head 0, sector 0) on the disk 110. The load data structure contains read indications which indicate a partition initially to be read from (such as the variable partition 310 or operating system partition 320, shown in FIG. 3) by the load program to load permanent or variable load modules stored on the partition. The load data structure is, for example, the Master Boot Record provided on conventional MS-DOS disks. The Master Boot Record contains a set of "partition descriptors" 401, each corresponding to a different partition on the disk 110. A full description of the partition descriptors is given on p. 192 of "Advanced MS-DOS Programming," Copyright 1986 by Ray Duncan, published by Microsoft Press. Each partition descriptor corresponds to a partition on the disk 110. Each partition descriptor contains as a read indication a read flag 402 that can be set or cleared and has a partition identifier 403 which identifies the location of that partition.

If a read flag 402 is set (for example, to 80H) then the corresponding partition (indicated by the partition identifier in that partition descriptor) is "active" and the load program reads load instructions from the partition identified by the partition identifier 403, and executes the load instructions to load the operating system load modules stored thereon. If the read flag 402 is cleared (for example, to 00H) the corresponding partition is "inactive" and the operating system load modules stored thereon are not loaded.

As explained in the Background of the Invention section, conventionally, only the single operating system partition has been implemented to store the operating system instructions composing the operating system. Conventionally, only this single operating system partition has been accessed by the load program to load all of the load modules stored thereon. The present invention, however, provides at least one variable partition which can be accessed in addition to the conventionally provided single operating system partition. Each variable partition contains variable load modules which are optionally loaded in addition to the permanent load modules stored on the operating system partition.

Accordingly, the present invention utilizes the load data structure (e.g., the conventional Master Boot Record) to designate a first partition (either the operating system partition or a variable partition) to be read from by the load program. For example, a read flag 402 in a partition descriptor in the Master Boot Record is set to indicate that a corresponding partition is to be read from when the load program initially references the Master Boot Record. Further, as will be explained, the present invention utilizes the variable partitions themselves to designate any number of additional partitions (the operating system partition or variable partitions) stored anywhere on the disk. Thus, the partitions from which the operating system instructions are loaded are, notwithstanding the size of the disk on which they are provided, unlimited in number and size.

Figure 5A:
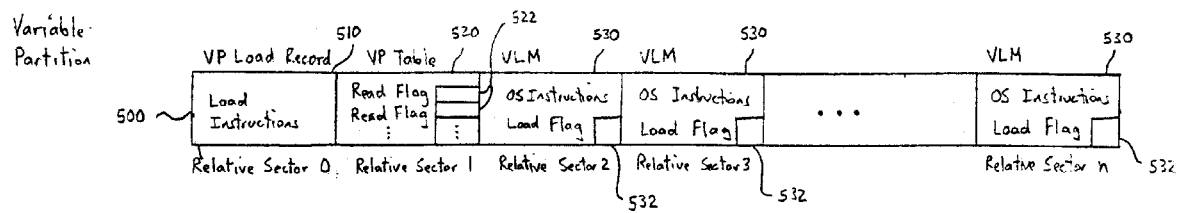
FIG. 5A is an illustration of the variable partition provided in the preferred embodiment of the invention.

FIG. 5A is an illustration of the variable partition provided in the preferred embodiment of the invention. In FIG. 5A, the variable partition 500 is shown as it is provided as a partition on the disk 110. The variable partition 500 contains a variable partition load record (VP Load Record) 510 stored at relative sector 0 of the variable partition, a variable partition read table (VP Table) 520 stored at relative sector 1 of the variable partition, and variable load modules (VLM) 530 stored at relative sectors 2–n of the variable partition. The load record 510 contains load instructions which are similar to those provided in the load record in the conventional operating system partition. The load instructions in the load record 510 are read and executed by the load program to load the variable load modules 530.

Only variable load modules which the user has indicated as active are loaded. Each variable load module 530 contains, along with the operating system instructions (OS Instructions), a load indication (Load Flag) 532 which indicates whether the variable load module is active. For example, each load indication is a load flag 532 which is set (for example, to 80H) when the corresponding variable load module is active and cleared (for example, to 00H) when the corresponding variable load module is inactive. Upon referencing the variable partition, the load program reads each load flag 532 and only loads the corresponding variable load modules if it is indicated as active by that load flag 532.

The variable partition 500 also indicates a next partition to be read from by the load program. As noted above, the load data structure 400 indicates only a first partition to be read from. Thus, the variable partition read table 520 in each variable partition contains a table of read flags 522 and corresponding partition identifiers 523. One of these read flags indicates that the partition identified by the corresponding partition identifier is the next partition from which variable or permanent load modules are to be read. Upon completion of loading each of the variable load modules 530, the load program reads the variable partition read table 520. The load program determines the partition indicated by the read flag 522 stored in the variable partition read table 520 that is set as active. The load program then reads from the partition which is identified by the partition identifier 523 that corresponds to the active read flag 522 in the variable partition read table 520. If the partition identifier 523 indicates a variable partition, then a variable partition such as the variable partition 500 described above is read from and processed by the load program, as described above. If the partition identifier 523 indicates the operating system partition, then the operating system partition is read from and processed by the load program, as will be described.

Figure 5B:
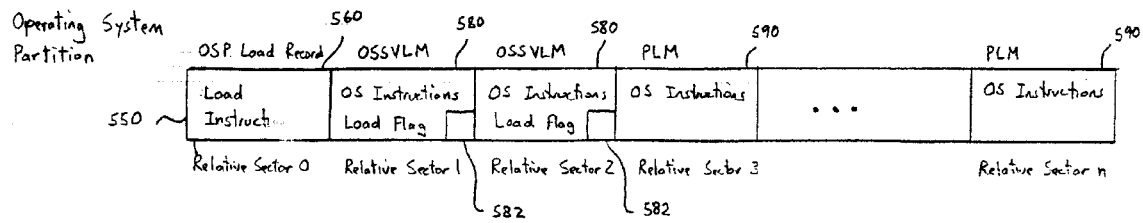
FIG. 5B is an illustration of the operating system partition provided in the preferred embodiment of the invention.

FIG. 5B is an illustration of the operating system partition provided in the preferred embodiment of the invention. In FIG. 5B, the operating system partition 550 is shown as it is provided on the disk 110. The operating system partition 550 contains an operating system partition load record 560 (OSP Load Record) stored at relative sector 0 of the operating system partition. In a particularly preferred embodiment, one or more operating system specific variable load modules (OSSVLM) 580 are provided, shown stored at relative sectors 1 and 2 of the operating system partition, in addition to one or more permanent load modules (PLM) 590, shown stored at relative sectors 3–n. The permanent load modules 590 are, for example, conventional operating system load modules, containing operating system instructions (OS instructions) which compose an underlying operating system as provided on the conventional MS-DOS disk. The operating system partition is the last partition to be read from by the load program, and thus the operating system specific variable load modules 580 and permanent load modules 590 are the last modules to be loaded.

The operating system partition load record 560 contains load instructions which are read and executed by the load program to load the permanent load modules 590 and to load specified modules of the operating system specific variable load modules 580. Each operating system specific variable load module 580 contains a load indication which indicates whether the variable load module is active, as well as operating instructions such as those contained in the permanent load modules 590, For example, the load indication is a load flag 582 which is set (for example, to 80H) when the operating system specific variable load module is active and cleared (for example, to 00H) when the operating system specific variable load module is inactive. Although all permanent load modules 590 are loaded, only operating system specific variable load modules 580 which are indicated as active by a corresponding load flag 582 are loaded.

The permanent load modules 590, taken together, comprise operating system instructions for the underlying operating system, that is, the portion of the operating system which must always be loaded. The operating system specific variable load modules, on the other hand, are only loaded when specified by the user. For example, the operating system partition is a conventional MS-DOS logical volume provided in a partition. The MS-DOS logical volume contains a number of files referenced by a root directory. The permanent load modules 590 are implemented as ordinary files in the MS-DOS logical volume, each of which contains operating system instructions. The operating system specific variable load modules 580, however, since loaded only if so indicated, are accompanied by a corresponding load indication (such as the load flag 582 stored within each operating system specific variable load module). The operating system specific variable load modules 580 are, for example, ordinary files in the MS-DOS logical volume, but each of which additionally stores a load indication indicating whether the operating system specific variable load module is to be loaded when the operating system partition is accessed by the load program.

In the particularly preferred embodiment, the variable load modules 530 stored in the variable partition 500 are operating system independent variable load modules. That is, the operating system instructions comprised by each of the variable load modules 530 are independent of the underlying operating system as defined by the permanent load modules loaded from the operating system partition. Such operating system independent instructions may be provided independent of the underlying operating system and thus may be provided to supplement any underlying operating system operating system. By contrast, the operating system specific load modules 580 stored in the operating system partition 550 are compatible only with the underlying operating system defined by the permanent load modules 590 stored in the operating system partition.

Figure 6:
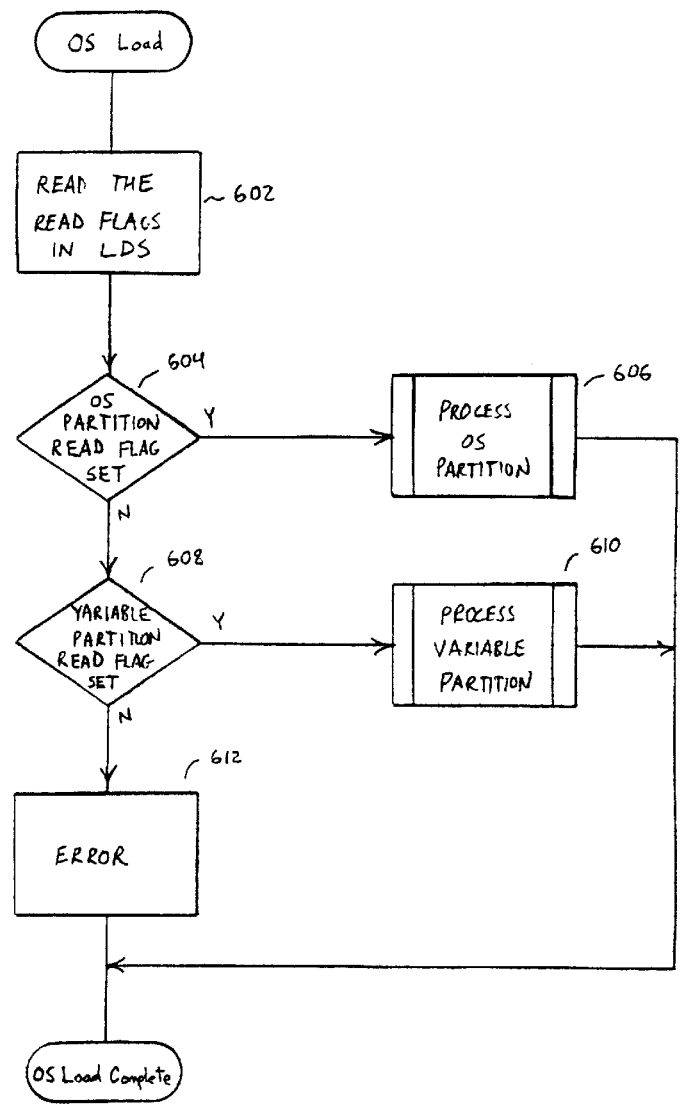
FIG. 6 is a flow diagram of the Operating System Load routine provided in the preferred embodiment of the invention.

FIG. 6 is a flow diagram of the Operating System Load routine of the preferred embodiment. The Operating System Load routine (OS Load) shown in FIG. 6 is executed by the load program stored in the memory 104 upon startup of the computer system in which the memory 104 is provided. The Operating System Load routine reads the load data structure 400 and examines the read indications therein. The Operating System Load routine then processes a partition (either a variable partition 500 or the operating system partition 550) indicated by a read indication which is set to indicate that the partition is active.

In step 602, the routine reads the read flags 402 stored in the load data structure (LDS) 400. In step 604, the routine determines whether a read flag 402 corresponding to the operating system partition 550 is set. For example, the routine reads the Master Boot Record and locates the partition descriptor which contains the partition identifier that identifies the location of the operating system partition 550. If so, control branches to step 606, wherein the operating system partition 550 is processed, as will be explained with reference to FIG. 7.

Otherwise, control proceeds to step 608, wherein the routine determines whether a read flag 402 corresponding to a variable partition 500 is set. For example, the routine reads the Master Boot Record and locates a partition descriptor which contains a partition identifier that identifies a variable partition 400. If so, control branches to step 610, wherein the corresponding variable partition is processed, as will be explained with reference to FIG. 8. Otherwise, control proceeds to step 612, wherein the routine outputs an error indication is via the display 140 to indicate that the load program is unable to load the operating system. After steps 606, 610 or 612 are performed, the Operating System Load routine is complete.

Figure 7:
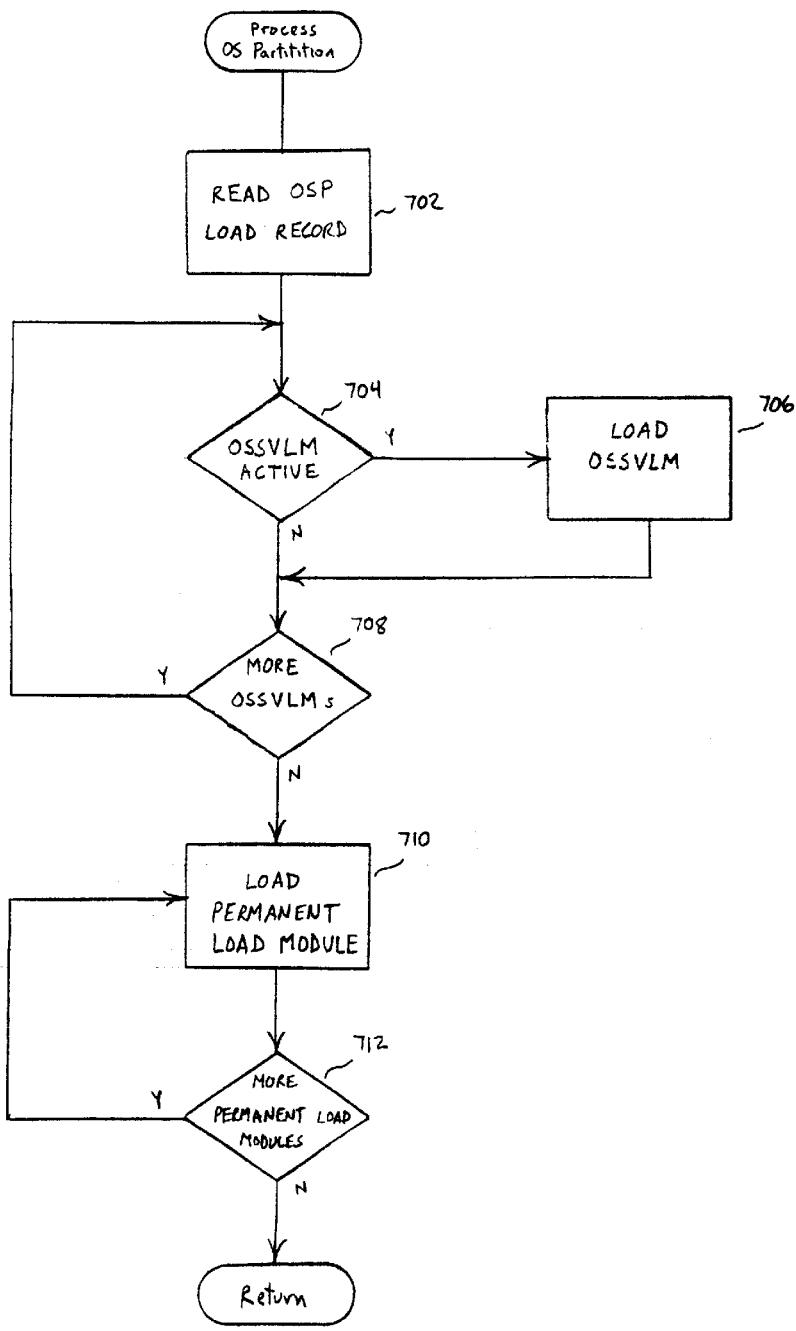
FIG. 7 is a flow diagram of the Process Operating System Partition routine provided in the preferred embodiment of the invention.

FIG. 7 is a flow diagram of the Process Operating System Partition routine of the preferred embodiment. The Process Operating System Partition routine shown in FIG. 7 corresponds to step 606 of the Operating System Load routine. The Process Operating System Partition routine reads the operating system partition load record 560 in the operating system partition 550 and executes the load instructions therein. The Process Operating System Partition routine loads all operating system specific variable load modules stored in the operating system partition which are indicated as active, and then loads all permanent load modules stored in the operating system partition.

In step 702, the routine reads the load instructions in the operating system partition load record 560. In step 704, the routine determines whether a load flag 582 corresponding to an operating system specific variable load module (OSSVLM) 580 is set as active. If so, control branches to step 706, wherein the routine loads the operating system specific variable load module so indicated by executing the load instructions read from the operating system partition load record 560 with respect to the indicated operating system specific variable load module. Otherwise, control proceeds to step 708, wherein the routine determines whether additional operating system specific variable load modules are present in the operating system partition 550. If so, control loops to repeat step 704. Otherwise, control proceeds to step 710, wherein the routine loads a permanent load module 590 by executing the load instructions with respect to that permanent load module 590. In step 712, the routine determines whether additional permanent load modules are present in the operating system partition 550. If so, control loops to repeat step 710. Otherwise, the routine is complete and control returns to the Operating System Load routine.

Figure 8:
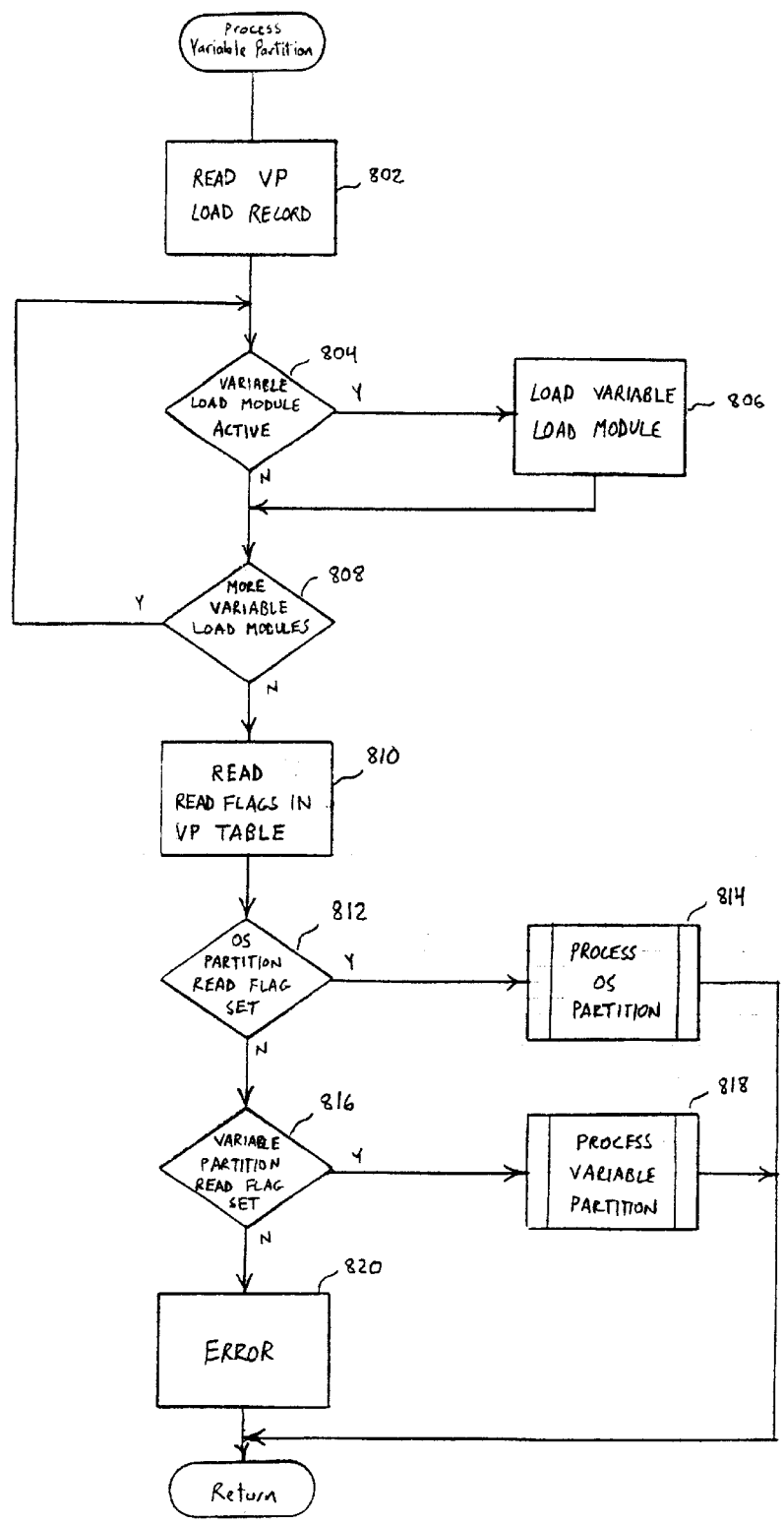
FIG. 8 is a flow diagram of the Process Variable Partition routine provided in the preferred embodiment of the invention.

FIG. 8 is a flow diagram of the Process Variable Partition routine of the preferred embodiment. The Process Variable Partition routine shown in FIG. 8 corresponds to step 610 of the load program. The Process Variable Partition routine reads the variable partition load record 510 in the variable partition 500 and executes the load instructions therein. The Process Variable Partition routine loads all variable load modules 530 stored in the partition which are indicated as active. The Process Variable Partition routine then reads the read indications in the variable partition read table 520 and processes a next partition as indicated.

In step 802, the routine reads the load instructions in the variable partition load record 510. In step 804, the routine determines whether a load flag 532 corresponding to a variable load module 530 is set as active. If so, control branches to step 806, wherein the routine loads the variable load module so indicated by executing the load instructions read from the variable partition load record 510 with respect to the indicated variable load module. Otherwise, control proceeds to step 808, wherein the routine determines whether additional variable load modules are present in the variable partition 500. If so, control loops to repeat step 804. Steps 804–808 are repeated as long as additional variable load modules are present in the variable partition 500. Otherwise, control proceeds to step 810.

In step 810, the routine reads the read flags 522 stored in the variable partition table 520. In step 812, if a read flag 522 corresponding to the operating system partition 550 is set, then control branches to step 814, wherein the Process Operating System Partition routine is performed. For example, the routine reads the Master Boot Record and locates the partition descriptor which contains the partition identifier that identifies the operating system partition 550. Otherwise, control proceeds to step 816. In step 816, if a read flag 522 corresponding to a next variable partition 500 is set, then control branches to step 818, wherein the Process Variable Partition routine is again performed with respect to the next variable partition 500. Otherwise, control proceeds to step 820, wherein an error indication is output via the display 140 to indicate that the load program is unable to load the operating system. After steps 814, 818 or 820 are performed, the routine is complete, and control is returned to the Operating System Load routine.

Figure 9:
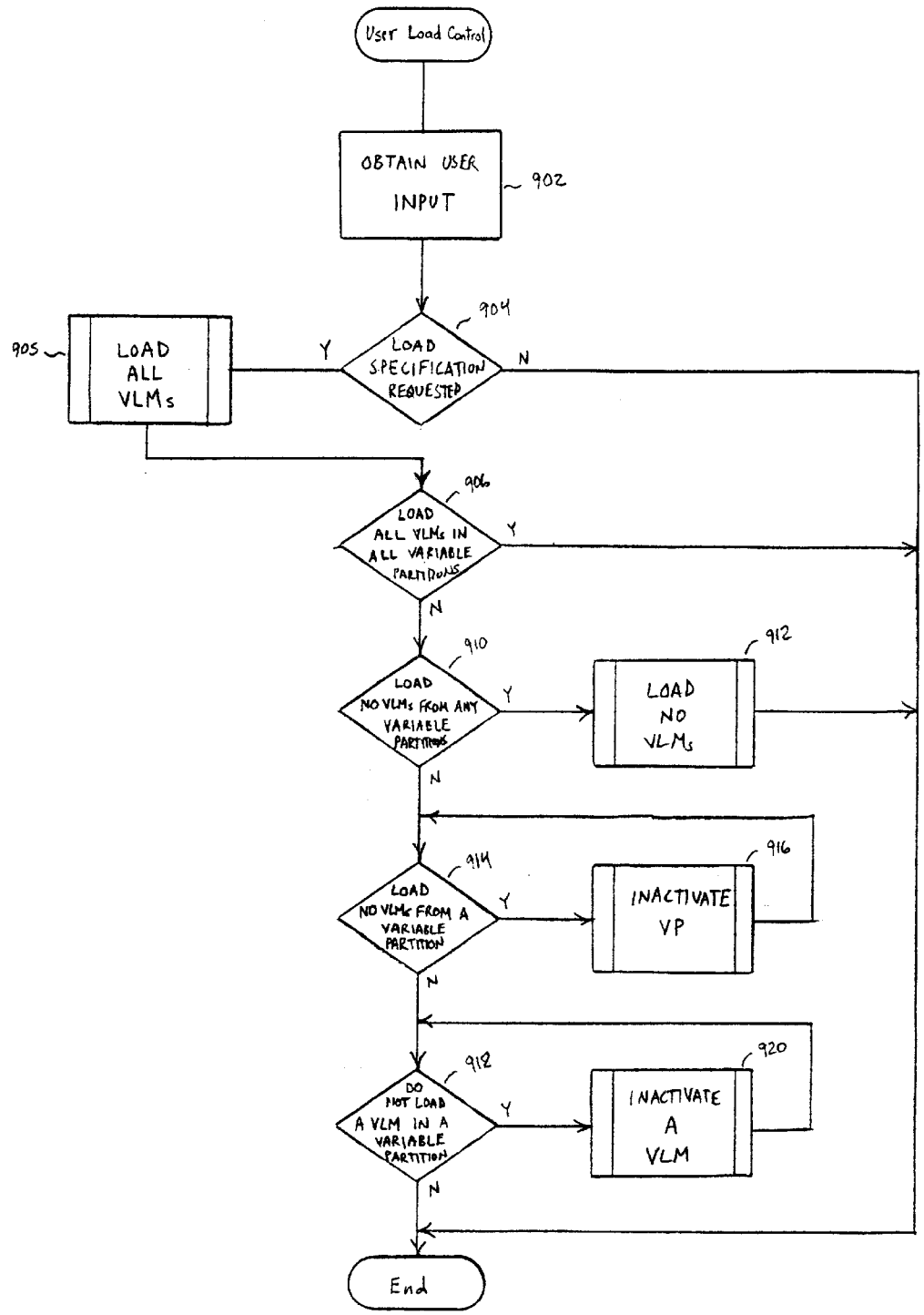
FIG. 9 is an flow diagram of the User Load Control routine provided in the preferred embodiment of the invention.

FIG. 9 is a flow diagram of the User Load Control routine in the preferred embodiment of the invention. The User Load Control routine is performed by the load program stored in the memory 104 prior to performing the Operating System Load routine. For example, the routine is performed at computer startup to control the loading of the operating system at that time, or at any time during operation of the computer system to control the loading of the operating system to occur upon a next startup of the computer system. The User Load Control routine obtains an identification from the user of the user-specified load modules to be loaded. The user can designate as the user-specified load modules any of the following options: all variable load modules in all variable partitions, all variable load modules in only specific variable partitions, specific variable load modules in all variable partitions, or specific variable load modules in either a variable partition or the operating system partition. This designation is made by, for example, selecting an option with the keyboard 120 or mouse 130 from a list of these options displayed on the display monitor 140.

In step 902, the routine obtains user input from the user via the keyboard 120 or mouse 130. If, in step 904, the user input is a load specification request to specify loading of the operating system, control proceeds to step 905, wherein the routine initially sets the appropriate load indications and read indications to load all variable load modules in all variable partitions. (Step 905 will be explained in detail with reference to FIG. 10). Control then proceeds to step 906. Otherwise, control branches to end the routine. Where the routine is executed at computer startup and the user has previously specified the user-specified load modules as desired, the user may choose not to request a load specification, in which case the routine would end at this point.

In step 906, the routine determines whether the user input is a specification to load all variable load modules in all variable partitions. If so, control branches to end the routine, since step 905 has been executed to set the appropriate load indications and read indications to load all variable load modules in all variable partitions. Otherwise, control proceeds to step 910. In step 910, the routine determines whether the user input is a specification to load no variable load modules in any variable partitions. If so, control branches to step 912, wherein the routine sets the appropriate load indications and read indications to load no variable load modules from any of the variable partitions. (Step 912 will be explained in detail with reference to FIG. 11). Otherwise, control proceeds to step 914.

In step 914, the routine determines whether the user input is a specification to load no variable load modules from a variable partition 500. If so, control branches to step 916, wherein the routine sets the appropriate read indications to inactivate a selected variable partition 500 so that no variable load modules 530 from the specified variable partition will be loaded. (Step 916 will be explained in detail with reference to FIG. 12). Control then loops to repeat step 914. Steps 914 and 916 are repeated as long as the user input specifies that no variable load modules should be loaded from a variable partition. Otherwise, control proceeds to step 918.

In step 918, the routine determines whether the user input is a specification not to load a variable load module 530. If so, control branches to step 920, wherein the routine sets the appropriate load indications to inactivate a specified variable load module 530 so that it will not be loaded. (Step 920 will be explained in detail with reference to FIG. 13). Control then loops to repeat step 918. Steps 918 and 920 are repeated as long as the user input specifies that a variable load module 530 should not be loaded. After steps 904, 912 or 918 are performed, the routine ends.

Figure 10:
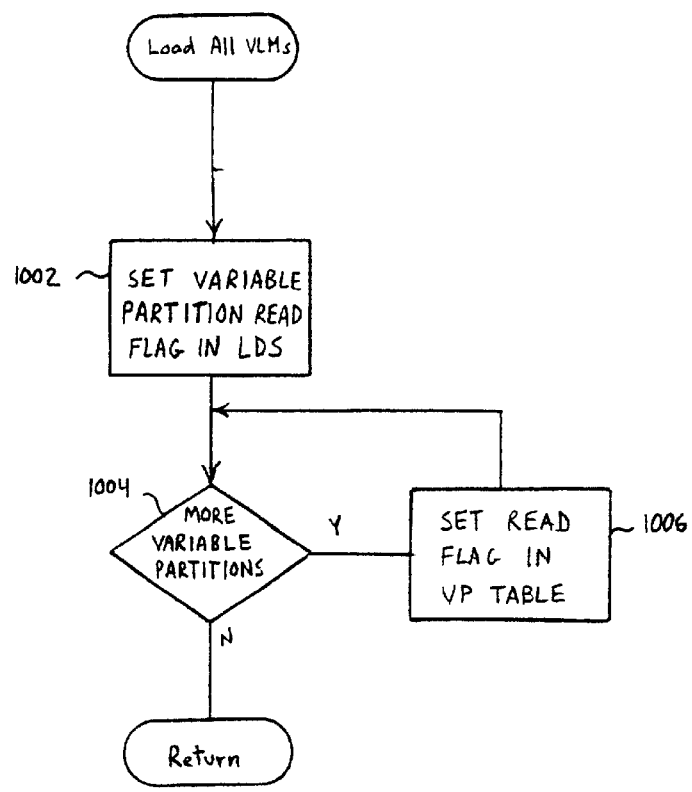
FIG. 10 is a flow diagram of the Load All Variable Load Modules routine provided in the preferred embodiment of the invention.

FIG. 10 is a flow diagram of the Load All Variable Load Modules routine in the preferred embodiment of the invention. The Load All Variable Load Modules routine shown in FIG. 10 sets the appropriate load indications and read indications to load all variable load modules in all variable partitions. The Load All Variable Load Modules corresponds to step 905 of the User Load Control routine. In step 1002, the routine sets to "active" the read flag 402 stored in the load data structure 400 which corresponds to a variable partition. The routine sets the read flag 402 by, for example, setting the appropriate read flag to 80H. In step 1004, if additional variable partitions exist, control branches to step 1006, wherein the routine references the variable partition 500 most recently indicated as "active" and sets to "active," in the same fashion, the read flag 522 stored in the variable partition table 520. Control then loops to repeat step 1004. Steps 1004 and 1006 are performed for as long as additional variable partitions exist on the disk 110. Otherwise, control returns to the User Load Control routine.

Figure 11:
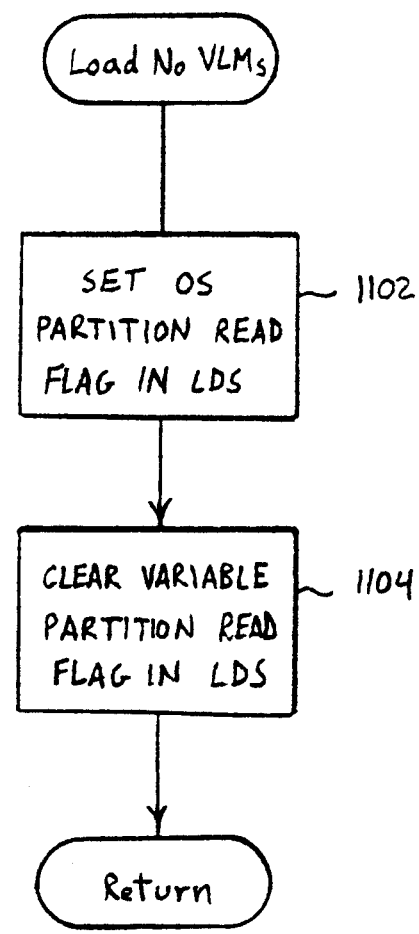
FIG. 11 is a flow diagram of the Load No Variable Load Modules routine provided in the preferred embodiment of the invention.

FIG. 11 is a flow diagram of the Load No Variable Load Modules routine in the preferred embodiment of the invention. The Load No Variable Load Modules routine shown in FIG. 11 sets the appropriate load indications and read indications to load no variable load modules from any of the variable partitions. The Load No Variable Load Modules routine corresponds to step 912 of the User Load Control routine. In step 1102, the routine sets to "active" the read flag 402 stored in the load data structure 400 which indicates the operating system partition 550. The User Load Control routine sets the read flag 402 or 522 by, for example, setting the appropriate read flag to 80H. In step 1104, the routine clears to "inactive" any read indication stored in the load data structure 400 which corresponds to a variable partition by, for example, clearing the appropriate read flag to 00H. Control then returns to the User Load Control routine.

Figure 12:
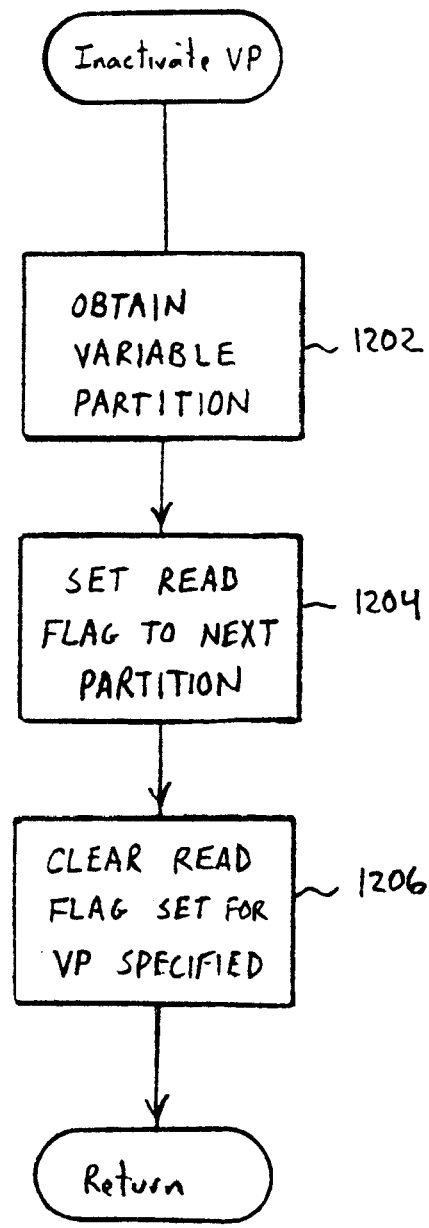
FIG. 12 is a flow diagram of the Inactivate Variable Partition routine provided in the preferred embodiment of the invention.

FIG. 12 is a flow diagram of the Inactivate Variable Partition routine in the preferred embodiment of the invention. The Inactivate Variable Partition routine shown in FIG. 12 sets the appropriate read indications to inactivate a selected variable partition. The Inactivate Variable Partition routine corresponds to step 916 of the User Load Control routine. In step 1202, the routine obtains from the user an identification of a variable partition to inactivate. In step 1204, the routine sets to "active" the read flag (which currently indicates the identified variable partition) to indicate a next variable partition 500. The next partition is the partition indicated by the read flag 522 stored in the variable partition table 520 of the identified variable partition. In step 1206, the routine clears to "inactive" the read flag which currently indicates the identified variable partition by, for example, clearing the appropriate read flag 402 or 502 to 00H. This read flag 402 or 502 may be stored in either the load data structure 400 or a variable partition read table 520, respectively, which currently indicates the identified variable partition. The routine then returns to the User Load Control routine.

Figure 13:
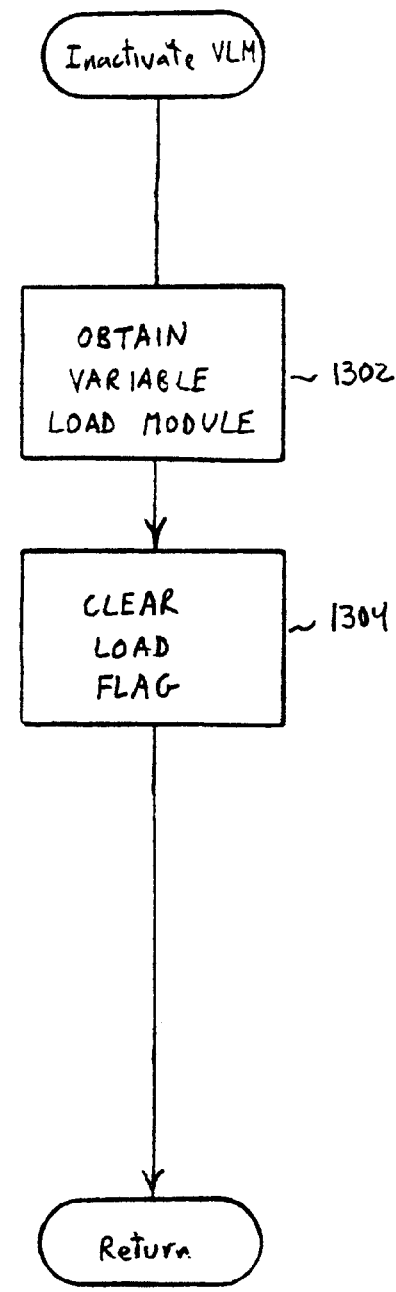
FIG. 13 is a flow diagram of the Inactivate Variable Load Module routine provided in the preferred embodiment of the present invention.

FIG. 13 is a flow diagram of the Inactivate Variable Load Module routine in the preferred embodiment of the present invention. The Inactivate Variable Load Module routine shown in FIG. 13 sets the appropriate load indications to inactivate a selected variable load module. The selected variable load module can be either an operating system independent variable load module in a variable partition or an operating system specific variable load module in the operating system partition. The Inactivate Variable Load Module routine corresponds to step 920 of the User Load Control routine. In step 1302, the routine obtains from the user an identification of a variable load module to inactivate. In step 1304, the routine clears to "inactive" the load flag 532 or 582 corresponding to the identified variable load module 530 or 580, respectively. The routine clears the load flag by, for example, clearing the appropriate load flag. The routine then returns to the User Load Control routine.

Although the present invention has been described in terms of a preferred embodiment, the invention is not limited to this embodiment. The scope of the invention is defined by the claims. Modifications within the spirit of the invention will be apparent to those skilled in the art. For example, the inventive method and system has been generally described with reference to variable load modules which are provided in addition to the permanent load modules that conventionally compose an operating system. Each variable load module contains operating system instructions to be additionally included in an operating system when the variable load module is selected by the user. One of ordinary skill in the art will recognize a variety of routines which can be implemented or created using the operating system instructions within the variable load modules.

For example, typically provided operating system features can be optionally included or chosen from among a variety of alternative routines. Further, supplemental routines can be added to current operating system versions to enhance the operating system or correct inaccuracies or deficiencies therein. Also, security can be provided with respect to the features implemented within specified variable load modules. It should be understood that such features are not limited to those typically thought of as part of an operating system. Rather, one of ordinary skill in the art will recognize an unlimited variety of features that can be implemented with the variable load modules and selectably loaded based on input from the user. Yet other variations and implementations of the present invention will also be readily apparent to one skilled in the art.

What is claimed is:

1. A computer system for loading an operating system in accordance with input from a user, the computer system comprising:

(a) a storage device storing at least one permanent load module comprising essential operating system instructions, and at least one variable load module comprising additional operating system instructions, the permanent load module and the variable load module comprising operating system instructions; and (b) a computer, connected to the storage device, and comprising:
 (i) a memory;
 (ii) means for obtaining from the user an indication of whether the variable load module is to be included in the operating system to be loaded as a user-specified variable load modules;
 (iii) means for loading the permanent load module into the memory;
 (iv) means for loading the user-specified variable load module according to the user indication before loading the permanent load module into the memory, the operating system instructions in the user-specified variable load module and permanent load module comprising the loaded operating system; and
 (v) a central processing unit executing the operating system instructions comprised by the user-specified variable load module and the permanent load module.

2. The computer system of claim 1 wherein the variable load module is a system security routine and the computer system further comprises:

means for executing the loaded system security routine before the permanent load module is loaded so as to prevent an unauthorized user from accessing the computer.

3. The computer system of claim 1 wherein the permanent load module is stored in a compressed format and the variable load module is a data decompression routine, the computer system further comprising:

means for executing the loaded data decompression routine before the permanent load module is loaded so as to decompress the compressed operating system instructions in the permanent load module.

4. The computer system of claim 1 wherein the variable load module is a storage device driver routine and the means for loading the permanent load module comprises:

means for executing the loaded storage device driver routine to enable the computer to communicate with the storage device.

5. The computer system of claim 1 wherein the variable load module is computer hardware dependent and operating system independent.

6. A computer system for loading an operating system in accordance with input from a user, the computer system comprising:

(a) a storage device storing a permanent load module comprising essential operating system instructions, and at least one variable load module comprising additional operating system instructions, the permanent load module and the variable load module comprising operating system instructions;

(b) a processor;

(c) a memory;

(d) an input device connected to the processor, the input device for obtaining from the user an indication of whether the variable load module is to be loaded into the memory as a user-specified variable load module; and (e) a loader for loading the user-specified variable load module into the memory and for loading the permanent load module into the memory after the user-specified variable load module is loaded into the memory, the operating system instructions in the user-specified variable load module and the permanent load module comprising the operating system, wherein the processor executes the loaded operating system.

7. A computer-readable storage medium storing an operating system that controls operation of a computer, the operating system comprising:

(a) a permanent load module comprising essential operating system instructions, to be loaded into a computer memory; and (b) at least one variable load module comprising additional operating system instructions, to be loaded into the computer memory according to user input before the permanent load module is loaded, the variable load module and the permanent load module comprising operating system instructions.

8. A computer-readable storage medium storing an operating system that controls operation of a computer, the operating system comprising:

at least one variable load module comprising additional operating system instructions, to be loaded into a computer memory according to user input before a permanent load module comprising essential operating system instructions, is loaded into the computer memory, the variable load module and the permanent load module comprising operating system instructions.

9. A method, performed by a component connected to a computer, of transmitting a variable load module of an operating system to the computer in accordance with input from a user, the method comprising the steps of:

(a) storing in the component at least one variable load module comprising additional operating system instructions, to be loaded into a memory of the computer before a permanent load module comprising essential operating system instructions, is loaded;

(b) receiving a request from the computer for at least one variable load module identified by the user; and (c) transmitting the user-identified variable load module to the computer for loading into the computer memory before the permanent load module is loaded.

10. The computer system according to claim 1, wherein the additional operating system instructions contained in the first variable load module include a routine that controls the manner of loading the permanent load module and the computer system further comprises means for executing the routine before the permanent load module is loaded so as to control the manner of loading the permanent load module.

11. The computer-readable storage medium according to claim 8, wherein the additional operating system instructions contained in the first variable load module include a routine that controls the manner of loading the permanent load module.

12. In a computer system having a memory and a storage device storing at least one permanent load module, wherein the permanent load module comprises essential operating system instructions, and at least one variable load module, wherein the variable load module comprises additional operating system instructions, the permanent load module and the variable load module comprising operating system instructions, a method of loading an operating system from the storage device into the memory, the method comprising:

obtaining an identification of a first variable load module to be loaded into the memory from a master boot record;

loading the operating system instructions contained in the first variable load module; and obtaining an identification of a permanent load module to be loaded into memory; and loading the operating system instructions contained in the permanent load module after the operating system instructions contained in the first variable load modules are loaded in the memory.

13. The method as recited in claim 12, wherein obtaining an identification of a first variable load module includes obtaining the identification of the first variable load module from a user.

14. The method as recited in claim 12, wherein the storage device stores a plurality of variable load modules.

15. The method as recited in claim 14, further comprising:

obtaining an identification of one or more of the plurality of variable load modules to be loaded into the memory; and loading the operating system instructions contained in the one or more identified variable load modules prior to loading the operating instructions contained in the permanent load module.

16. The method as recited in claim 15, wherein obtaining an identification of one or more of the plurality of variable modules includes obtaining a user identification of one or more of the plurality of valuable modules to be loaded into the memory.

17. The method as recited in claim 16, wherein obtaining a user identification of one or more of the plurality of variable modules to be loaded into the memory includes obtaining an identification from a user of all of the plurality of variable modules.

18. The method as recited in claim 12, wherein the variable load module is a system security routine, and wherein the method further comprises:

executing the loaded system security routine prior to loading the operating system instructions in the permanent load module;

determining by the executing system security routine whether the user is authorized or unauthorized; and preventing the user from accessing the computer when the user is determined to be unauthorized.

19. The method as recited in claim 12, wherein the permanent load module is stored in a compressed format and the variable load module is a data decompression routine, and wherein the method further comprises executing the loaded data decompression routine to decompress the compressed operating system instructions in the storage device prior to loading the operating system instructions in the permanent load module.

20. The method as recited in claim 12, wherein the variable load module is a storage device driver routine and wherein loading the operating system instructions in the permanent load module includes executing the loaded storage driver routine.

21. The method as recited in claim 12, wherein the variable load module is computer hardware dependent and operating system independent.

22. The method as recited in claim 12, wherein the additional operating system instructions contained in the first variable load module include a routine that controls the manner of loading the permanent load module.

23. The method as recited in claim 22, wherein the routine is a data decompression routine and the permanent load module is stored in a compressed format, and wherein the routine controls the loading of the permanent load module by decompressing the compressed format of the permanent load module upon loading of the permanent load module.

24. The method as recited in claim 22, wherein the routine is a system security routine and wherein the routine controls the loading of the permanent load module by:

determining whether a user of the computer is authorized to load the permanent load module; and if the user is authorized, the system security routine allows the loading of the permanent load module else the system security routine prevents the loading of the permanent load module.

25. The method as recited in claim 22, wherein the routine further controls the manner of loading the other variable load module.

26. A computer-readable medium having computer-implementable instructions for performing the method recited in any one of claims 12–25.

27. A computer system having a processor, a memory, and an operating system, the computer system operable to perform the method recited in any one of claims 12–25.

* * * * *

UNITED STATES PATENT AND TRADEMARK OFFICE
CERTIFICATE OF CORRECTION

PATENT NO. : 6,357,000 B1
DATED : March 12, 2002
INVENTOR(S) : N.K. Jain

It is certified that error appears in the above-identified patent and that said Letters Patent is hereby corrected as shown below:

<u>Title page,</u>
*Assistant Examiner*, "Sne" should read -- Sue --

<u>Column 1,</u>
Line 17, "applications" should read -- application --

<u>Column 4,</u>
Line 48, "variable load" should read -- *variable* load --

<u>Column 5,</u>
Line 23, "independent variable" should read -- *independent* variable --
Lines 25 and 56, "specific variable" should read -- *specific* variable --
Line 29, "first partition" should read -- *first* partition --
Line 31, "next partition" should read -- *next* partition --
Line 58, "operating system partition" should read -- *operating system* partition --
Line 59, "independent variable load" should read -- *independent* variable load --
Line 61, "variable partition" should read -- *variable* partition --

<u>Column 6,</u>
Line 23, "can be referenced" should read -- *can* be referenced --

<u>Column 7,</u>
Line 51, "first partition" should read -- *first* partition --
Line 59, "additional partitions" should read -- *additional* partitions --

<u>Column 9,</u>
Line 7, "590, For example," should read -- 590. For example, --

<u>Column 10,</u>
Line 15, "indication is via" should read -- indication via --

<u>Column 11,</u>
Line 37, "computer system to" should read -- computer system, to --

<u>Column 13,</u>
Line 43, "method and system has" should read -- method and system have --

UNITED STATES PATENT AND TRADEMARK OFFICE
CERTIFICATE OF CORRECTION

PATENT NO. : 6,357,000 B1
DATED : March 12, 2002
INVENTOR(S) : N.K. Jain

It is certified that error appears in the above-identified patent and that said Letters Patent is hereby corrected as shown below:

Column 14,
Line 18, "variable load modules;" should read -- variable load module; --
Lines 31, 37, 46 and 52, "claim 1" should read -- claim 1, --

Column 16,
Line 7, "module; and" should read -- module; --
Line 31, "valuable modules" should read -- variable modules --

Column 17,
Line 13, "module else" should read -- module, else --

Signed and Sealed this

First Day of April, 2003

JAMES E. ROGAN
*Director of the United States Patent and Trademark Office*